United States Patent
Lin et al.

(10) Patent No.: US 12,487,215 B2
(45) Date of Patent: Dec. 2, 2025

(54) METHOD AND APPARATUS FOR DETERMINING CONCENTRATION OF COMPOUND IN ULTRAPURE WATER

(71) Applicant: Taiwan Semiconductor Manufacturing Company, Ltd., Hsinchu (TW)

(72) Inventors: En-Tian Lin, Taoyuan (TW); Chiao-Ling Weng, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 723 days.

(21) Appl. No.: 17/814,010

(22) Filed: Jul. 21, 2022

(65) Prior Publication Data

US 2024/0027411 A1   Jan. 25, 2024

(51) Int. Cl.
  *G01N 31/22* (2006.01)
  *G01N 33/18* (2006.01)
(52) U.S. Cl.
  CPC ......... *G01N 31/228* (2013.01); *G01N 31/225* (2013.01); *G01N 33/1893* (2013.01)
(58) Field of Classification Search
  CPC ............... G01N 31/228; G01N 31/225; G01N 33/1893; G01N 33/18
  See application file for complete search history.

(56) References Cited

U.S. PATENT DOCUMENTS 3,238,452 A * 3/1966 Schmitt ............... G01N 27/223
                                                        73/61.41
3,913,384 A * 10/1975 Furuya ................. G01N 33/18
                                                         73/19.1

FOREIGN PATENT DOCUMENTS

JP   2018025454     * 2/2018
JP   2018025454 A   * 2/2018

* cited by examiner

*Primary Examiner* — Tarun Sinha
(74) *Attorney, Agent, or Firm* — McClure, Qualey & Rodack, LLP

(57) ABSTRACT

A method for determining the concentration of a compound in ultrapure water is provided. The method includes dividing the ultrapure water into a first part and a second part and decomposing the compound in the first part, so that the first part includes a characteristic substance. The method also includes measuring a first concentration of the characteristic substance in the first part and a second concentration of the characteristic substance in the second part and calculating the difference between the first concentration and the second concentration. The method further includes obtaining the concentration of the compound in the ultrapure water based on the difference.

20 Claims, 6 Drawing Sheets

METHOD AND APPARATUS FOR DETERMINING CONCENTRATION OF COMPOUND IN ULTRAPURE WATER

BACKGROUND

Ultrapure water is water that is treated to achieve the highest levels of purity. For manufacturing semiconductor devices (e.g., solid-state devices, thin-film devices, communication lasers, light-emitting diodes, photo-detectors, printed circuits, memory devices, vacuum-tube devices, or electrolytic devices, etc.) and semiconductor components (e.g., transistors, diodes, resistors, capacitors, etc.), ultrapure water is used extensively in the semiconductor industry. The semiconductor industry continues to improve the integration density of various semiconductor devices and semiconductor components by continual reductions in minimum feature size, which allow more components, hence more functions, to be integrated into a given area. However, as integration density increases, the quality standards of ultrapure water may also become stricter. Therefore, it's important to determine the concentration of some compounds in the ultrapure water to obtain the levels of purity.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion. The figures may be simplified for the sake of clarity to better understand different aspects of the disclosure.

DETAILED DESCRIPTION

Figure 1:
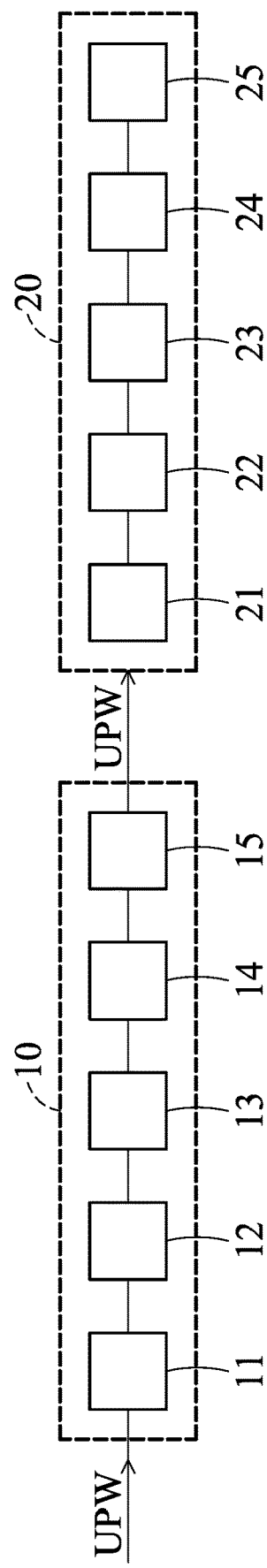
FIG. 1 illustrates pretreatment of ultrapure water and processes using the ultrapure water in the semiconductor industry.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of apparatuses and methods for determining the concentration of a compound in ultrapure water are provided. The ultrapure water is divided into a first part and a second part. The compound in the first part undergoes a decomposition reaction to include a characteristic substance, and the second part does not undergo any reaction. Therefore, a first concentration of the characteristic substance in the first part is higher than a second concentration of the characteristic substance in the second part. The difference between the first concentration and the second concentration may be attributed to the decomposition of the compound in the first part. By deriving the relationship between the difference between the first concentration and the second concentration and the concentration of the compound, the concentration of the compound in the ultrapure water can be obtained. The apparatuses and methods can be used in existing ultrapure water systems without major system change, so costs may be reduced. In addition, the apparatuses and methods are able to achieve real-time measurement.

FIG. 1 illustrates pretreatment 10 of ultrapure water UPW and processes 20 using the ultrapure water UPW in the semiconductor industry. As shown in FIG. 1, the pretreatment 10 may include a heat exchange treatment 11, an ultraviolet (UV) irradiation treatment 12, an ion exchange treatment 13, a degasification treatment 14, and an ultrafiltration (UF) treatment 15. Additional treatment may be added, and some of the treatment can be replaced, modified, or eliminated. For example, the pretreatment may also include reverse osmosis (RO), gas transfer membrane (GTM) degasification, electrodeionization (EDI), etc.

After the ultrapure water UPW is pretreated to reach the ideal levels of purity, it can be used for different processes in the semiconductor industry. As shown in FIG. 1, the ultrapure water UPW is used extensively in the semiconductor industry. For example, at early stages in fabrication, processes 20 may include a wafer cleaning process 21 and a surface conditioning process 22. At other different stages in fabrication, processes 20 may also include a surface cleaning process 23, a wet etching process 24, and a chemical mechanical planarization (CMP) process 25. In addition, chemical liquids used in the semiconductor industry also require the ultrapure water UPW. For example, the wet etching process 24 usually requires the ultrapure water UPW for etching liquid, and the CMP process 25 usually requires a large amount of the ultrapure water UPW for slurry. It should be noted that the ultrapure water UPW may also be used in other semiconductor processes.

As the ultrapure water UPW undergoes different treatment and different processes, the concentrations of some compounds in the ultrapure water UPW may change. To ensure the quality of the ultrapure water UPW, it is advantageous to obtain the concentrations of compounds in the ultrapure water UPW. For example, the quality standards for the concentration of hydrogen peroxide ($H_2O_2$) in the ultrapure water UPW may be less than 50 ppb, such as 40 ppb, 30 ppb, 20 ppb, 10 ppb, but the standards are not limited thereto. The quality standards for the concentration of silicon dioxide ($SiO_2$) in the ultrapure water UPW may be less than 0.5 ppb, such as 0.4 ppb, 0.3 ppb, 0.1 ppb, 0.05 ppb, but the standards are not limited thereto.

Typically, to measure the concentration of a compound in the ultrapure water UPW, one or more samples are collected from the ultrapure water UPW for testing, the testing is usually time-consuming, and thus the concentration of the compound in the ultrapure water UPW cannot be obtained quickly enough. In addition, since the concentration of the compound in the ultrapure water UPW is relatively small, the accuracy of the testing may be low.

Figure 2:
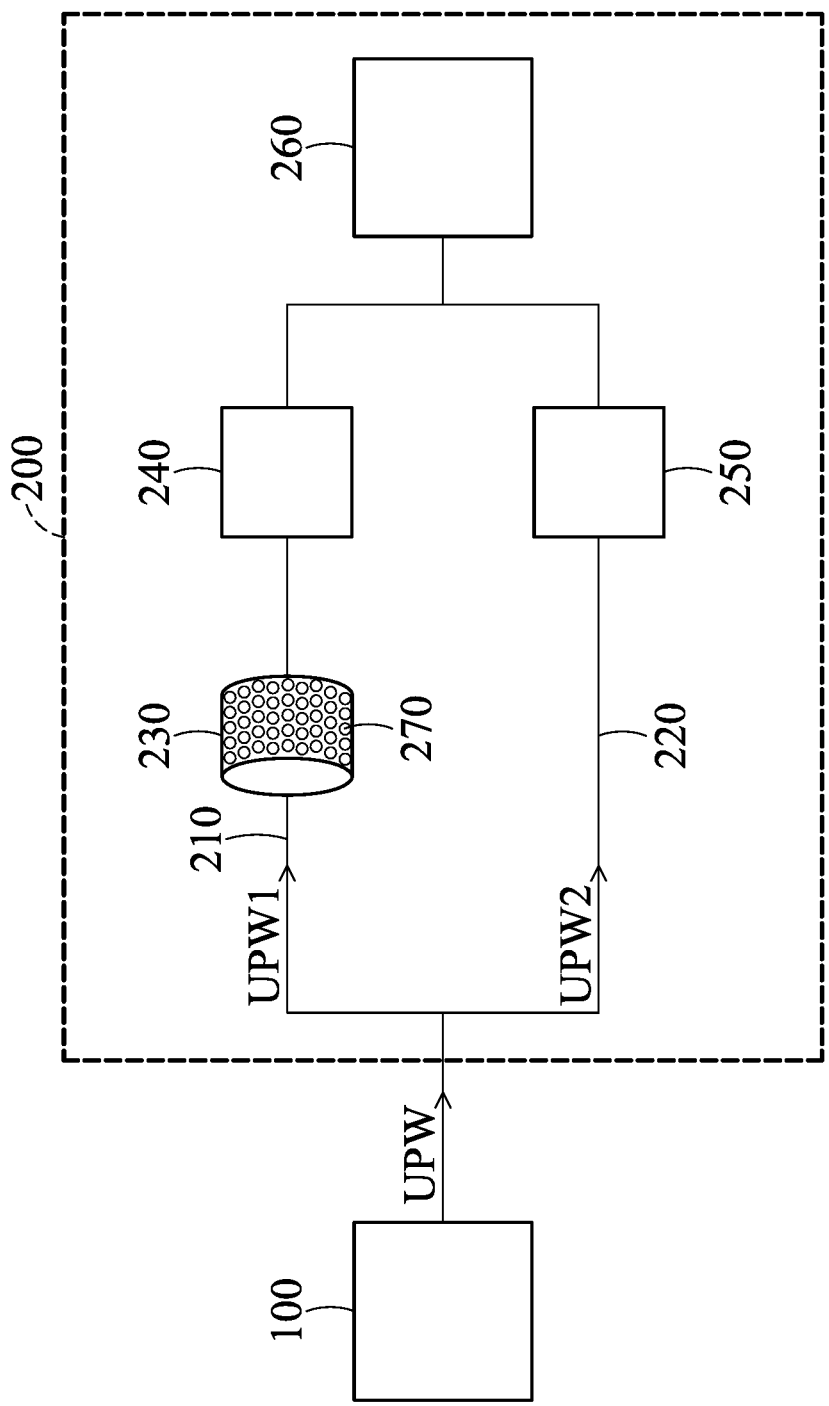
FIG. 2 illustrates an apparatus for determining the concentration of a compound in the ultrapure water in accordance with some embodiments.

Embodiments of the present disclosure provide apparatuses and methods that are able to achieve real-time measurement without major system change and achieve high accuracy measurement. Please refer to FIG. 2. FIG. 2 illustrates an apparatus 200 for determining the concentration of a compound in the ultrapure water UPW in accordance with some embodiments. The compound whose concentration is determined may be selected according to the actual needs. The compound may be any compound that is soluble in the ultrapure water UPW, such as an organic compound, silicon dioxide, hydrogen peroxide. The compound may be viewed as part of the impurities in the ultrapure water UPW.

The apparatus 200 includes a first pipe 210, a second pipe 220, a reactor 230, a first measuring device 240, a second measuring device 250, and a control device 260. The apparatus 200 may be located downstream of an ultrapure water system 100. In other words, the first pipe 210, the second pipe 220, the reactor 230, the first measuring device 240, the second measuring device 250, and the control device 260 are all located downstream of the ultrapure water system 100. In some embodiments, the other end of apparatus 200 may be coupled to the ultrapure water system 100, so that the flow of the ultrapure water UPW is continuous, but it is not limited thereto. In some embodiments, the apparatus 200 may be coupled to another ultrapure water system and located between two ultrapure water systems, so that the flow of the ultrapure water UPW is continuous, but it is not limited thereto.

The second pipe 220 is separated from the first pipe 210. The reactor 230 is provided on the first pipe 210. The first measuring device 240 is provided on the first pipe 210. The second measuring device 250 is provided on the second pipe 220. The control device 260 is coupled to the first measuring device 240 and the second measuring device 250. In some embodiments, the control device 260 is a general purpose computing device including a processor, a storage medium, an input/output (I/O) interface, a network interface, etc.

In some embodiments, the processor may include a central processing unit (CPU), a multi-processor, a distributed processing system, an application specific integrated circuit (ASIC), etc. In some embodiments, the storage medium may include may include a semiconductor or solid-state memory, a magnetic tape, a removable computer diskette, a random access memory (RAM), a read-only memory (ROM), a rigid magnetic disk, an optical disk, etc.

In some embodiments, the I/O interface may include a keyboard, a keypad, a mouse, a trackball, a trackpad, a touchscreen, and cursor direction keys for communicating information and commands to the processor. In some embodiments, the network interface may include wireless network interfaces such as BLUETOOTH, WIFI, WIMAX, GPRS, or WCDMA or wired network interfaces such as ETHERNET, USB, or IEEE-1364.

The processor may be electrically coupled to the storage medium, the I/O interface, and the network interface via a bus. The control device 260 is configured to receive information through the I/O interface. The information is transferred to the processor via the bus. The processor may configured to execute computer program code encoded in storage medium in order to cause the control device 260 to be usable for performing a portion or all of the noted processes and/or methods.

After the ultrapure water UPW flows out of the ultrapure water system 100, the ultrapure water UPW is divided into a first part UPW1 flowing through the first pipe 210 and a second part UPW2 flowing through the second pipe 220. The first part UPW1 undergoes a reaction. In detail, the compound in the first part UPW1 is decomposed in the reactor 230, so that the first part UPW1 includes a characteristic substance. The conversion of the compound into the characteristic substance is described by Equation 1, as follows:

$$\text{The compound} \rightarrow \text{The characteristic substance} + \text{Other possible products} \quad \text{(Equation 1)}$$

In some embodiments, to accelerate the decomposition of the compound, the reactor 230 may be provided with a catalyst 270, and the catalyst 270 may be selected depending on the compound and the characteristic substance.

The characteristic substance is usually a substance whose concentration can be measured quickly and accurately. For example, in some embodiments, the compound includes oxygen (O) atoms, the compound may be decomposed to include oxygen ($O_2$), and a dissolved oxygen (DO) meter may be used to measure the concentration of oxygen. Under the circumstances, oxygen is referred to as "the characteristic substance". In some embodiments, the compound includes hydrogen (H) atoms, the compound may be decomposed to include hydrogen ions ($H^+$), and a pH meter may be used to measure the concentration of hydrogen ions. Under the circumstances, hydrogen ions are referred to as "the characteristic substance".

After the first part UPW1 flows out of the reactor 230, 90.0%-100.0% of the compound in the first part UPW1 is decomposed, and the compound in the first part UPW1 may be viewed as almost completely decomposed. In some embodiments, the reaction residence time is less than one minute. That is, the decomposition of the compound in the first part UPW1 is less than one minute. In some embodiments, the decomposition of the compound in the first part UPW1 is less than thirty seconds. Meanwhile, the second part UPW2 does not undergo any reaction. Although the second part UPW2 does not undergo any reaction, the characteristic substance may already be present in the ultrapure water UPW (the characteristic substance may be soluble in the ultrapure water UPW). Still, it is certain that there is more characteristic substance in the first part UPW1 than in the second part UPW2. In other words, a first concentration of the characteristic substance in the first part UPW1 is higher than a second concentration of the characteristic substance in the second part UPW2. Therefore, the second concentration of the characteristic substance in the second part UPW2 is viewed as a baseline.

The first concentration of the characteristic substance in the first part UPW1 may be measured by the first measuring device 240. The second concentration of the characteristic substance in the second part UPW2 may be measured by the second measuring device 250. The first measuring device 240 and the second measuring device 250 may be measuring devices that have high accuracy. Therefore, the measurement accuracy may be high.

The difference between the first concentration of the characteristic substance in the first part UPW1 and the second concentration of the characteristic substance in the second part UPW2 may be calculated by the control device 260.

The difference between the first concentration and the second concentration may be attributed to the decomposition of the compound in the first part UPW1. The concentration of the compound in the ultrapure water is obtained based on the difference between the first concentration and the second concentration. In other words, the concentration of the compound in the ultrapure water UPW is not measured directly, but the concentration of the compound in the ultrapure water UPW may be derived from the difference between the first concentration and the second concentration.

In detail, Equation 1 includes coefficients of the compound and the characteristic substance to indicate how many molecules of the compound are used and how many molecules of the characteristic substance are produced. In addition, the molar mass of the compound and the molar mass of the characteristic substance can be found by using the mass given in the Periodic Table or table of atomic weights. By using the coefficients of Equation 1, the molar mass of the compound, and the molar mass of the characteristic substance, the concentration of the compound in the ultrapure water UPW can be obtained. In addition, after the relationship between the concentration difference and the concentration of the compound is derived, the relationship can be input into the control device 260 to quickly obtain the concentration of the compound in the ultrapure water UPW. For example, the derived relationship can be stored in the storage medium of the control device 260.

In some embodiments, after the concentration of the compound in the ultrapure water UPW is obtained, if the ultrapure water UPW does not reach the ideal levels of purity, the ultrapure water UPW cannot be used in semiconductor processes (e.g. processes 20). Otherwise, the ultrapure water UPW with non-ideal quality impacts the semiconductor device yield and the semiconductor component yield. In some embodiments, the ultrapure water UPW with non-ideal quality may be pretreated again, and the purity of the ultrapure water is checked before the ultrapure water is fed into semiconductor processes by performing a portion or all of the noted processes and/or methods. Therefore, the semiconductor device yield and the semiconductor component yield can be better managed.

Furthermore, during the determination of the concentration of the compound in the ultrapure water UP2, the quality of the first part UPW1 and the second part UPW2 may be not affected, and the first part UPW1 and the second part UPW2 can still be used for subsequent semiconductor processes or be recirculated back to the ultrapure water system 100. Therefore, no ultrapure water is wasted, and costs may be reduced.

In the following description, hydrogen peroxide is taken as an example of the compound whose concentration is determined. Hydrogen peroxide can be decomposed into oxygen and hydrogen ($H_2$), and oxygen is taken as an example of the characteristic substance whose concentration is measured. After the ultrapure water UPW flows out of the ultrapure water system 100, the ultrapure water UPW is divided into the first part UPW1 flowing through the first pipe 210 and the second part UPW2 flowing through the second pipe 220. Hydrogen peroxide (i.e. the compound whose concentration is determined) in the first part UPW1 is decomposed in the reactor 230, so that the first part UPW1 includes oxygen (i.e. the characteristic substance whose concentration is measured).

The decomposition of hydrogen peroxide may be represented by Equation 2, as follows:

$$2H_2O_2 \rightarrow O_2 + 2H_2 \qquad \text{(Equation 2)}$$

A first concentration C1 of oxygen in the first part UPW1 may be measured by the first measuring device 240. A second concentration C2 of oxygen in the second part UPW2 may be measured by the second measuring device 250. Since the characteristic substance is oxygen, the measuring device 240 and the measuring device 250 may be DO meters, but they are not limited thereto. The concentration difference C1−C2 may be obtained by the control device 260. From the coefficients of Equation 2, the molar mass of hydrogen peroxide, and the molar mass of oxygen, Equation 3 can be derived as follows:

$$[H_2O_2] = \frac{34}{32} \times 2 \times (C1 - C2) \qquad \text{(Equation 3)}$$

wherein:

$[H_2O_2]$: the concentration of hydrogen peroxide;
C1: the first concentration of oxygen in the first part UPW1; and
C2: the second concentration of oxygen in the second part UPW2.

Equation 3 can be further simplified to Equation 4 as follows:

$$[H_2O_2] = 2.125 \times (C1 - C2) \qquad \text{(Equation 4)}$$

wherein:

$[H_2O_2]$: the concentration of hydrogen peroxide;
C1: the first concentration of oxygen in the first part UPW1; and
C2: the second concentration of oxygen in the second part UPW2.

In some embodiments, a catalyst for accelerating the decomposition of hydrogen peroxide may be used. The catalyst may include a noble metal, but it is not limited thereto. The noble metal may be platinum (Pt), palladium (Pd), or silver (Ag). Since a noble metal is a metal that is generally resistant to corrosion, using the noble metal as the catalyst can ensure the quality of the first part UPW1, so the first part UPW1 can still be used for subsequent semiconductor processes or be recirculated back to the ultrapure water system 100.

Figure 3:
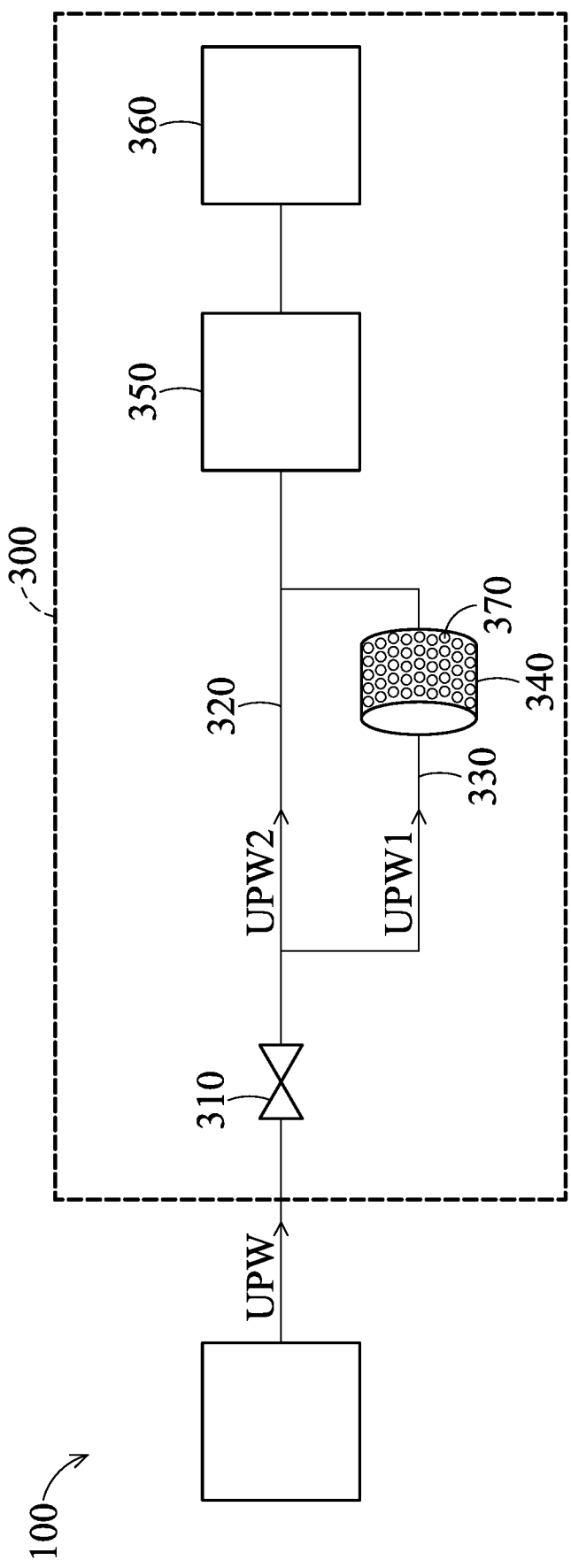
FIG. 3 and FIG. 4 illustrate apparatuses for determining the concentration of a compound in the ultrapure water is used in accordance with some other embodiments.
Figure 4:
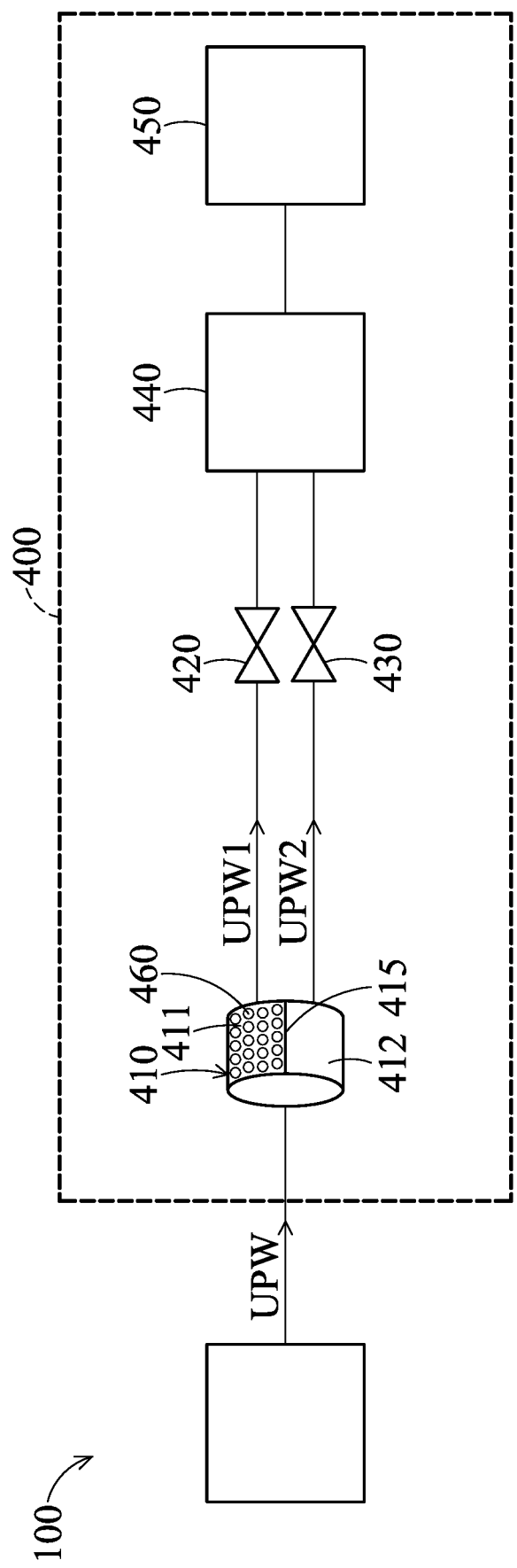

Next, please refer to FIG. 3 and FIG. 4. FIG. 3 and FIG. 4 illustrate apparatuses 300, 400 for determining the concentration of a compound in the ultrapure water is used in accordance with some other embodiments. For clear illustration, the ultrapure water UPW, the first part UPW1 and the second part UPW2 are denoted by the same symbols. The determination of the concentration of the compound in the ultrapure water is substantially the same. In addition, the device may have similar uses, so the related description is not repeated again.

The apparatus 300 includes a control valve 310, a main pipe 320, a bypass pipe 330, a reactor 340, a measuring device 350, and a control device 360. The apparatus 300 is used in the ultrapure water system 100. The reactor 340 is provided on the bypass pipe 330. In some embodiments, the reactor 340 is provided with a catalyst 370. It should be noted that the main pipe 320 of the apparatus 300 may also be the pipe of the ultrapure water system 100. In other words, the main pipe 320 may be viewed as part of the ultrapure water system 100. In this embodiment, the ultrapure water UPW is divided into the first part UPW1 flowing through the bypass pipe 330 and the second part UPW2 flowing through the main pipe 320. Similarly, the compound in the first part UPW1 undergoes a decomposition reaction, and the second part UPW2 does not undergo any reaction. The control valve 310 is configured to control whether the ultrapure water UPW flows through the main pipe 320 or flows through the bypass pipe 330. Therefore, the apparatus 300 can be used in the ultrapure water system 100 by simply adding one or more of the bypass pipe 330, the reactor 340, the measuring device 350, and the control device 360. In other words, the apparatus 300 can be used in the ultrapure water system 100 without major system change.

The apparatus 400 includes a reactor 410, two control valves 420, 430, a measuring device 440, and a control device 450. The apparatus 400 can be directly provided on the ultrapure water system 100. For example, the apparatus 400 can be directly provided on the pipe of the ultrapure water system 100. In this embodiment, the reactor 410 may include a separation plate 415, so the interior of the reactor 410 is divided into a first portion 411 and a second portion 412. The ultrapure water UPW is divided into the first part UPW1 flowing through the first portion 411 of the reactor 410 and the second part UPW2 flowing through the second portion 412 of the reactor 410. Similarly, the compound in the first part UPW1 undergoes a decomposition reaction, and the second part UPW2 does not undergo any reaction. In some embodiments, the first portion 411 of the reactor 410 through which the first part UPW1 flows is provided with a catalyst 460, and the second portion 412 of the reactor 410 through which the second part UPW2 flows is not provided with the catalyst 460. The control valves 420, 430 are configured to control whether the first part UPW1 or the second part UPW2 flows into the measuring device 440. Therefore, the apparatus 400 can be used in the ultrapure water system 100 by simply adding one or more of the reactor 410, the measuring device 440, and the control device 450. In other words, the apparatus 400 can be used in the ultrapure water system 100 without major system change.

Furthermore, in some embodiments, as illustrated in FIG. 3 and FIG. 4, only one measuring device is needed, and thus costs may be reduced. It should be noted although the control device (e.g. the control devices 260, 360, 450) is illustrated in FIG. 2 to FIG. 4, in some other embodiments, the measuring device may perform the calculation, and the control device may be omitted, so costs may be further reduced.

Figure 5B:
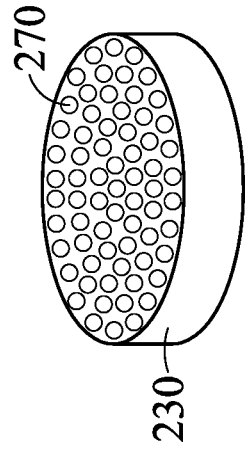
FIG. 5A and FIG. 5B are schematic views of a reactor and its interior in accordance with some embodiments.
Figure 5D:
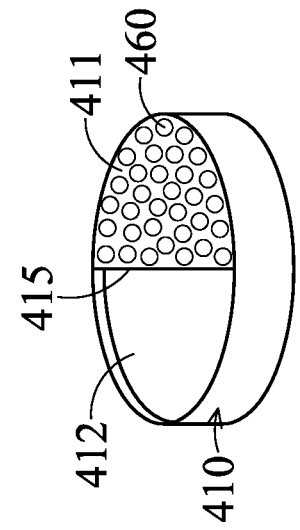
FIG. 5C and FIG. 5D are schematic views of a reactor and its interior in accordance with some other embodiments.
Figure 5A:
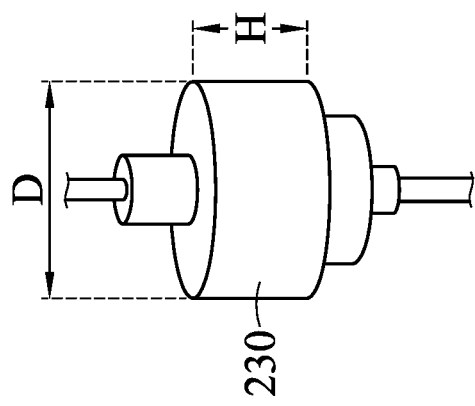
Figure 5C:
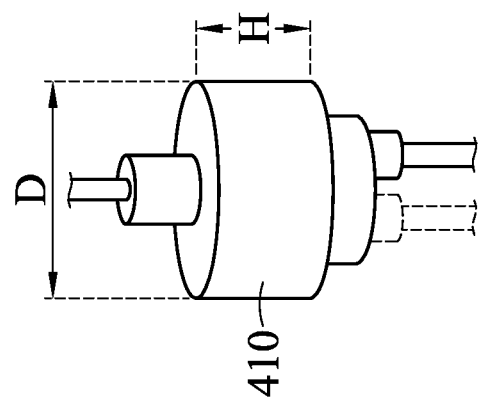

Next, please refer to FIG. 5A to FIG. 5D to see two types of reactors. FIG. 5A and FIG. 5B are schematic views of a reactor (e.g. the reactor 230) and its interior in accordance with some embodiments. In this embodiment, the reactor includes an inlet and an outlet, and most of its interior is filled with a catalyst (e.g. the catalyst 270). FIG. 5C and FIG. 5D are schematic views of a reactor (e.g., the reactor 410) and its interior in accordance with some other embodiments. In this embodiment, the reactor includes an inlet and two outlets, and its interior is divided by a separation plate (e.g. the separation plate 415) to include a first portion (e.g. the first portion 411) and a second portion (e.g. the second portion 412). The first portion is filled with a catalyst (e.g. the catalyst 460) while the second portion of interior is not filled with the catalyst 460. It should be noted that the reactor illustrated in FIG. 5C and FIG. 5D can also be used for the reactors 230, 340 by only using one outlet.

In some embodiments, the diameter D of the reactor may be in a range from 20 millimeters (mm) to about 80 mm, such as 70 mm, 60 mm, 50 mm, 40 mm, or 30 mm, but it is not limited thereto. In some embodiments, the height H of the reactor may be in a range from about 20 mm to about 50 mm, such as 45 mm, 40 mm, or 35 mm, but it is not limited thereto.

Figure 6:
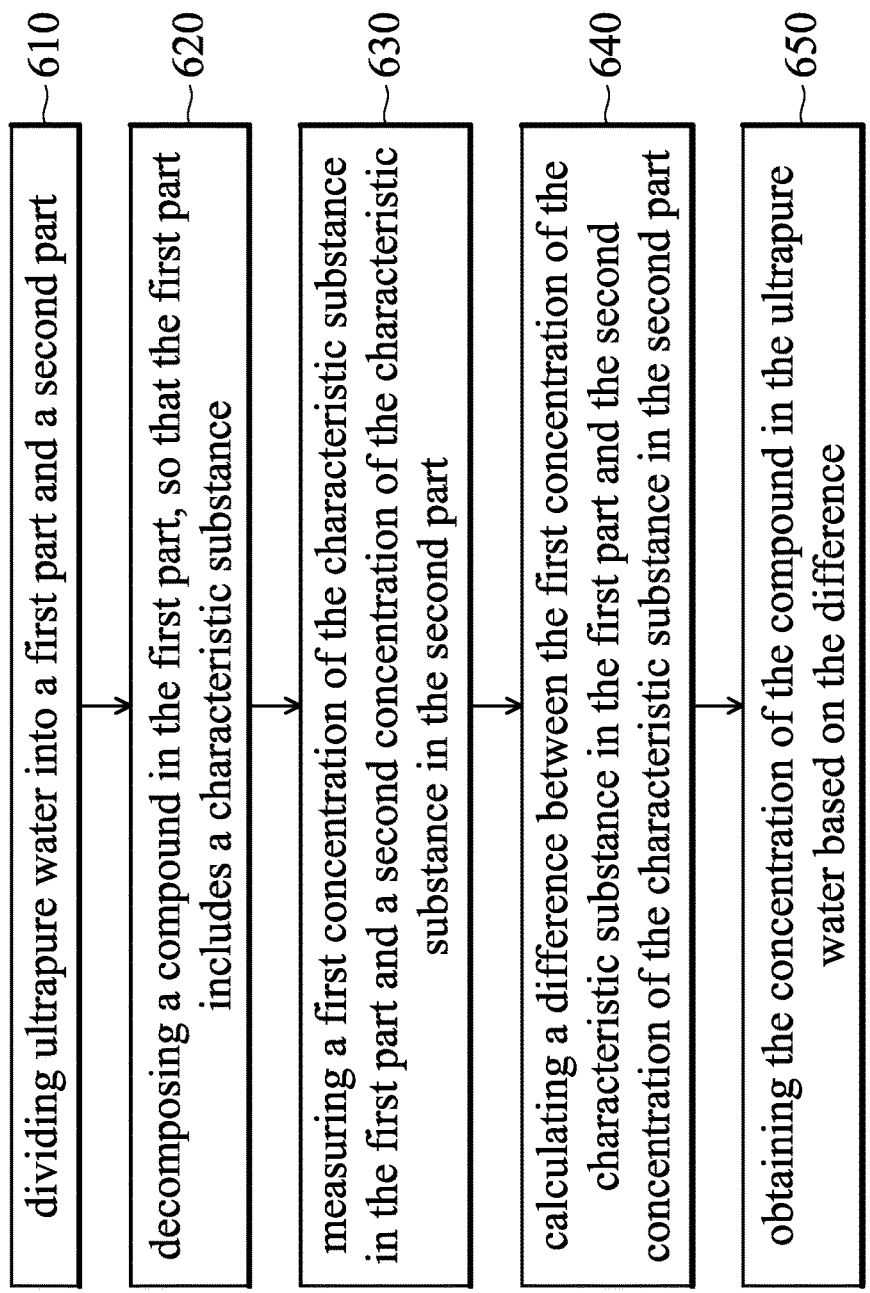
FIG. 6 is a flow chart of a method for determining the concentration of a compound in the ultrapure water.

FIG. 6 is a flow chart of a method 600 for determining the concentration of a compound in the ultrapure water. The method 600 includes steps 610-650. In the step 610, ultrapure water is divided into a first part and a second part. In some embodiments, the ultrapure water flows into two separate branches (e.g., the first pipe 210 and the second pipe 220 or the main pipe 320 and the bypass pipe 330), so that the ultrapure water is divided, but it is not limited thereto. In some other embodiments, the ultrapure water flows into the same device (e.g., the reactor 410), but is divided into two parts due to its interior structure (e.g. the separation plate 415). In the step 620, the compound in the first part is decomposed, so that the first part includes a characteristic substance. In other words, the compound in the first part is converted into the characteristic substance. Meanwhile, the second part does not undergo any reaction.

In the step 630, a first concentration of the characteristic substance in the first part is measured, and a second concentration of the characteristic substance in the second part is measured. Since the compound in the second part is not decomposed, the first concentration of the characteristic substance in the first part is higher than the second concentration of the characteristic substance in the second part UPW2. Therefore, the concentration of the characteristic substance in the second part may be viewed as a baseline. In the step 640, the difference between the first concentration and the second concentration is calculated. The calculation may be conducted by a measuring device and/or a control device.

In the step 650, the concentration of the compound in the ultrapure water is obtained based on the difference. The difference between the first concentration and the second concentration may be attributed to the decomposition of the compound in the first part. By using the coefficients of equation of the decomposition of the compound (e.g. Equation 1 and Equation 2), the molar mass of the compound, and the molar mass of the characteristic substance, the concentration of the compound in the ultrapure water can be obtained.

Embodiments of apparatuses and methods for determining the concentration of a compound in ultrapure water are provided. As described above, in the present disclosure, for determining the concentration of a compound in ultrapure water, the ultrapure water is divided into a first part and a second part. The compound in the first part undergoes a decomposition reaction to include a characteristic substance, and the second part does not undergo any reaction. Therefore, a first concentration of the characteristic substance in the first part is higher than a second concentration of the characteristic substance in the second part. The characteristic substance is usually a substance whose concentration can be measured quickly and accurately, so the first concentration and the second concentration can be measured quickly and accurately.

The difference between the first concentration and the second concentration may be attributed to the decomposition of the compound in the first part. The concentration of the compound in the ultrapure water may be derived from the difference between the first concentration and the second concentration. In detail, by using the coefficients of Equation that represents the decomposition of the compound, the molar mass of the compound, and the molar mass of the characteristic substance, the concentration of the compound in the ultrapure water can be obtained.

For example, if the compound is hydrogen peroxide and the characteristic substance is oxygen, the concentration of hydrogen peroxide may be the concentration difference of oxygen in the first part and the second part multiplied by 2.125. In some embodiments, after the relationship between the concentration difference and the concentration of the compound is derived, the relationship can be input into the apparatuses and be stored in the storage medium of the apparatuses.

In addition, to accelerate the decomposition of the compound, a catalyst may be provided, and the catalyst may be selected depending on the compound and the characteristic substance. For example, if the compound is hydrogen peroxide, the catalyst may include a metal, such as a noble metal. The noble metal may be platinum, palladium, or silver.

After the concentration of the compound in the ultrapure water is obtained, if the ultrapure water does not reach the ideal levels of purity, the ultrapure water cannot be used in semiconductor processes. Therefore, the semiconductor device yield and the semiconductor component yield can be better managed. Furthermore, during the determination of the concentration of the compound in the ultrapure water, the quality of the first part and the second part may be not affected, and the first part and the second part can still be used for subsequent semiconductor processes or be recirculated back to the ultrapure water system. Therefore, no ultrapure water is wasted, and costs may be reduced.

The apparatuses and methods can be used in existing ultrapure water systems without major system change, so costs may be reduced. In addition, the apparatuses and methods are able to achieve real-time measurement.

In accordance with some embodiments, a method for determining the concentration of a compound in ultrapure water is provided. The method includes dividing the ultrapure water into a first part and a second part and decomposing the compound in the first part, so that the first part includes a characteristic substance. The method also includes measuring the first concentration of the characteristic substance in the first part and a second concentration of the characteristic substance in the second part and calculating the difference between the first concentration of the characteristic substance in the first part and the second concentration of the characteristic substance in the second part. The method further includes obtaining the concentration of the compound in the ultrapure water based on the difference.

In accordance with some embodiments, an apparatus for determining the concentration of a compound in ultrapure water flowing through an ultrapure water system is provided. The apparatus includes a first pipe, a second pipe, a reactor, and a measuring device. The first pipe is located downstream of the ultrapure water system. The second pipe is located downstream of the ultrapure water system, wherein the second pipe is separated from the first pipe. The reactor is provided on the first pipe. The measuring device is located downstream of the ultrapure water system. After the ultrapure water flows out of the ultrapure water system, the ultrapure water is divided into a first part flowing through the first pipe and a second part flowing through the second pipe. The compound in the first part is decomposed in the reactor, so that the first part includes a characteristic substance. The measuring device measures the first concentration of the characteristic substance in the first part and the second concentration of the characteristic substance in the second part. The concentration of the compound in the ultrapure water is obtained based on the difference between the first concentration of the characteristic substance in the first part and the second concentration of the characteristic substance in the second part.

In accordance with some embodiments, an apparatus for determining the concentration of a compound in ultrapure water in an ultrapure water system The apparatus includes a reactor and a measuring device. The reactor is provided on a pipe of the ultrapure water system. The measuring device is coupled to the ultrapure water system. The ultrapure water that flows through the reactor is divided into a first part and a second part. The compound in the first part is decomposed in the reactor, so that the first part includes a characteristic substance. The measuring device measures the first concentration of the characteristic substance in the first part and the second concentration of the characteristic substance in the second part. The concentration of the compound in the ultrapure water is obtained based on the difference between the first concentration of the characteristic substance in the first part and the second concentration of the characteristic substance in the second part.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for determining a concentration of a compound in ultrapure water, comprising:
    dividing the ultrapure water into a first part that flows through a first portion of a reactor and a second part that flows through a second portion of the reactor, wherein the reactor has a separation plate that divides an interior of the reactor into the first portion and the second portion;
    decomposing the compound in the first part, so that the first part comprises a characteristic substance;
    measuring a first concentration of the characteristic substance in the first part;
    measuring a second concentration of the characteristic substance in the second part;
    calculating a difference between the first concentration of the characteristic substance in the first part and the second concentration of the characteristic substance in the second part; and
    obtaining the concentration of the compound in the ultrapure water based on the difference.

2. The method as claimed in claim 1, wherein the compound is hydrogen peroxide.

3. The method as claimed in claim 2, wherein hydrogen peroxide is decomposed into hydrogen and oxygen, and the characteristic substance is oxygen.

4. The method as claimed in claim 3, wherein the concentration of hydrogen peroxide in the ultrapure water is obtained using an Equation, as follows:

$[H_2O_2]=2.125\times(C1-C2)$, wherein:

$[H_2O_2]$: the concentration of hydrogen peroxide;

C1: the first concentration of oxygen in the first part; and

C2: the second concentration of oxygen in the second part.

5. The method as claimed in claim 1, wherein decomposing the compound in the first part further comprises using a catalyst to decompose the compound.

6. The method as claimed in claim 5, wherein the catalyst comprises a noble metal.

7. The method as claimed in claim 6, wherein the noble metal is platinum (Pt), palladium (Pd), or silver (Ag).

8. An apparatus for determining a concentration of a compound in ultrapure water flowing through an ultrapure water system, comprising:

a first pipe located downstream of the ultrapure water system;

a second pipe located downstream of the ultrapure water system, wherein the second pipe is separated from the first pipe;

a reactor provided on the first pipe and having a separation plate; and a measuring device located downstream of the ultrapure water system, wherein after the ultrapure water flows out of the ultrapure water system, the ultrapure water is divided into a first part flowing through the first pipe and a second part flowing through the second pipe, wherein the compound in the first part is decomposed in the reactor, so that the first part comprises a characteristic substance, wherein the measuring device measures a first concentration of the characteristic substance in the first part and a second concentration of the characteristic substance in the second part, and the concentration of the compound in the ultrapure water is obtained based on a difference between the first concentration of the characteristic substance in the first part and the second concentration of the characteristic substance in the second part.

9. The apparatus as claimed in claim 8, wherein the compound comprises oxygen atoms.

10. The apparatus as claimed in claim 9, wherein the characteristic substance is oxygen.

11. The apparatus as claimed in claim 10, wherein the measuring device is a dissolved oxygen meter.

12. The apparatus as claimed in claim 10, wherein the compound is hydrogen peroxide, and the concentration of hydrogen peroxide in the ultrapure water is obtained using an Equation, as follows:

$[H_2O_2]=2.125\times(C1-C2)$, wherein:

$[H_2O_2]$: the concentration of hydrogen peroxide;

C1: the first concentration of oxygen in the first part; and

C2: the second concentration of oxygen in the second part.

13. The apparatus as claimed in claim 8, wherein the reactor is provided with a catalyst.

14. The apparatus as claimed in claim 8, further comprising a control device configured to obtain the difference between the first concentration of the characteristic substance in the first part and the second concentration of the characteristic substance in the second part.

15. An apparatus for determining a concentration of a compound in ultrapure water in an ultrapure water system, comprising:

a reactor provided on a pipe of the ultrapure water system; and a measuring device coupled to the ultrapure water system, wherein the ultrapure water that flows through the reactor is divided into a first part and a second part, wherein the compound in the first part is decomposed in the reactor, so that the first part comprises a characteristic substance, wherein the measuring device measures a first concentration of the characteristic substance in the first part and a second concentration of the characteristic substance in the second part, and the concentration of the compound in the ultrapure water is obtained based on a difference between the first concentration of the characteristic substance in the first part and the second concentration of the characteristic substance in the second part, and wherein a first portion of the reactor through which the first part flows is provided with a catalyst, and a second portion of the reactor through which the second part flows is not provided with a catalyst.

16. The apparatus as claimed in claim 15, further comprising a bypass pipe coupled to the ultrapure water system, and the reactor is provided on the bypass pipe.

17. The apparatus as claimed in claim 16, further comprising a control valve coupled to the ultrapure water system, wherein the control valve is configured to control whether the ultrapure water flows in the ultrapure water system or flows through the bypass pipe.

18. The apparatus as claimed in claim 15, further comprising two control valves coupled to the measuring device, wherein the two control valves are configured to control whether the first part or the second part flows into the measuring device.

19. The apparatus as claimed in claim 15, wherein the compound is hydrogen peroxide, and the characteristic substance is oxygen, and the concentration of hydrogen peroxide in the ultrapure water is obtained using an Equation, as follows:

$[H_2O_2]=2.125\times(C1-C2)$, wherein:

$[H_2O_2]$: the concentration of hydrogen peroxide;

C1: the first concentration of oxygen in the first part; and

C2: the second concentration of oxygen in the second part.

20. The apparatus as claimed in claim 15, wherein a diameter of the reactor is greater than or equal to a height of the reactor.

* * * * *